United States Patent
Yamaguchi et al.

(10) Patent No.: US 8,553,162 B2
(45) Date of Patent: Oct. 8, 2013

(54) 3D IMAGE DISPLAY DEVICE

(75) Inventors: Hidemasa Yamaguchi, Aichi (JP); Shigeki Miyazaki, Kanagawa (JP)

(73) Assignee: Japan Display West Inc., Higashiura-Cho (JP)

( * ) Notice: Subject to any disclaimer, the term of this patent is extended or adjusted under 35 U.S.C. 154(b) by 175 days.

(21) Appl. No.: 13/239,879

(22) Filed: Sep. 22, 2011

(65) Prior Publication Data
US 2012/0081623 A1    Apr. 5, 2012

(30) Foreign Application Priority Data
Oct. 1, 2010  (JP) .................................. 2010-223813

(51) Int. Cl.
*G02F 1/1335* (2006.01)
*G02F 1/1347* (2006.01)

(52) U.S. Cl.
USPC .................................. 349/15; 349/96; 349/75

(58) Field of Classification Search
USPC ....................................... 349/15, 96
See application file for complete search history.

(56) References Cited

U.S. PATENT DOCUMENTS
4,884,876 A  * 12/1989 Lipton et al. .................... 349/33
2002/0044350 A1* 4/2002 Sato et al. ..................... 359/465
2011/0157333 A1* 6/2011 Lee et al. ......................... 348/56

FOREIGN PATENT DOCUMENTS
JP       08-327961       12/1996
JP       2002-082307 A    3/2002

* cited by examiner

*Primary Examiner* — Mike Qi
(74) *Attorney, Agent, or Firm* — Wolf, Greenfield & Sacks, P.C.

(57) ABSTRACT

A 3D image display device. The device may include: a display unit displaying left-eye and right-eye images alternately; a display-side polarizing plate arranged on the side of a display surface of the display unit; and shutter glasses having left-eye and right-eye shutters, and opening and closing a shutter in accordance with display states of images on the display unit. A shutter includes a liquid crystal cell, a retardation plate arranged at the liquid crystal cell, and a first glasses-side polarizing plate arranged at the liquid crystal cell on the side opposite to the retardation plate. Polarization axes of the display-side polarizing plate and the first glasses-side polarizing plate are orthogonal. The polarization axis of the display-side polarizing plate and a retardation axis of the retardation plate are parallel or orthogonal.

8 Claims, 18 Drawing Sheets

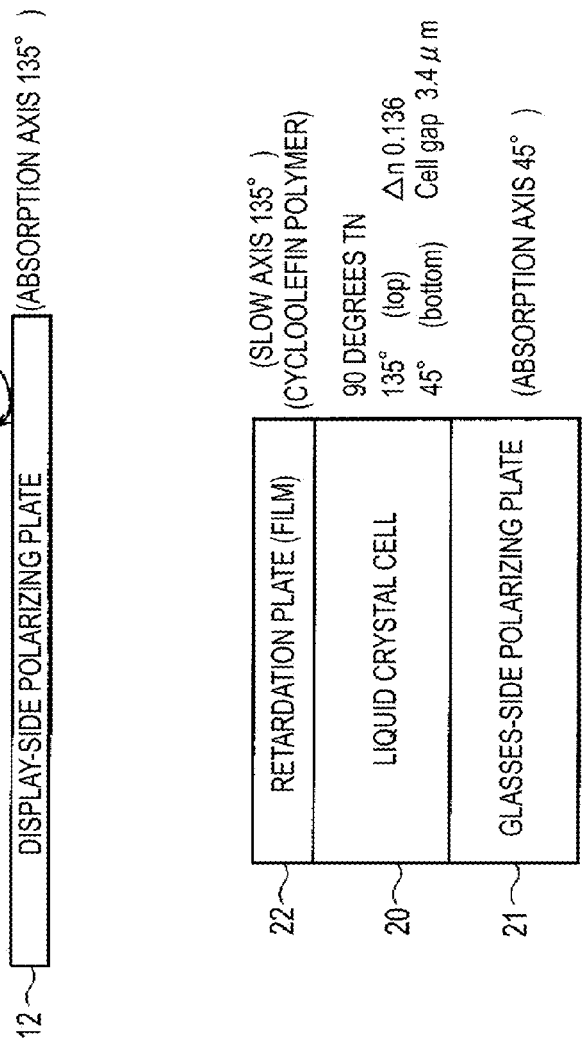

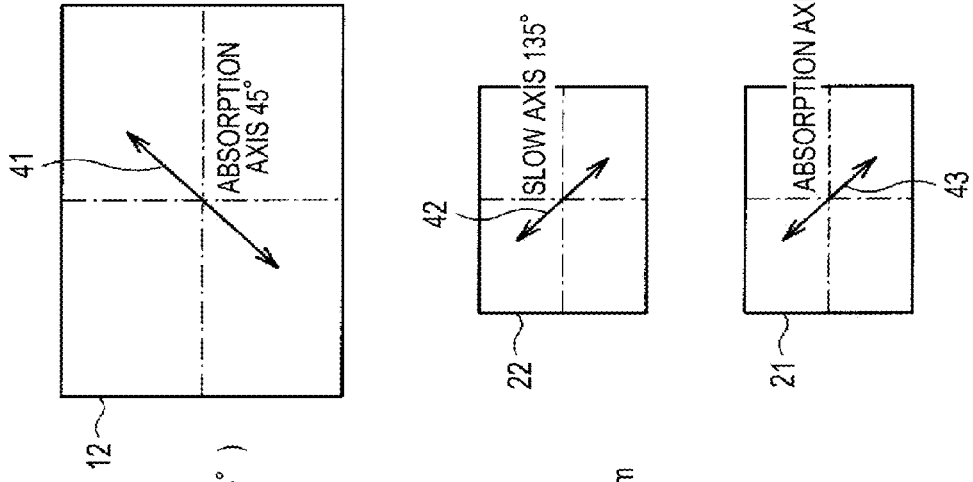
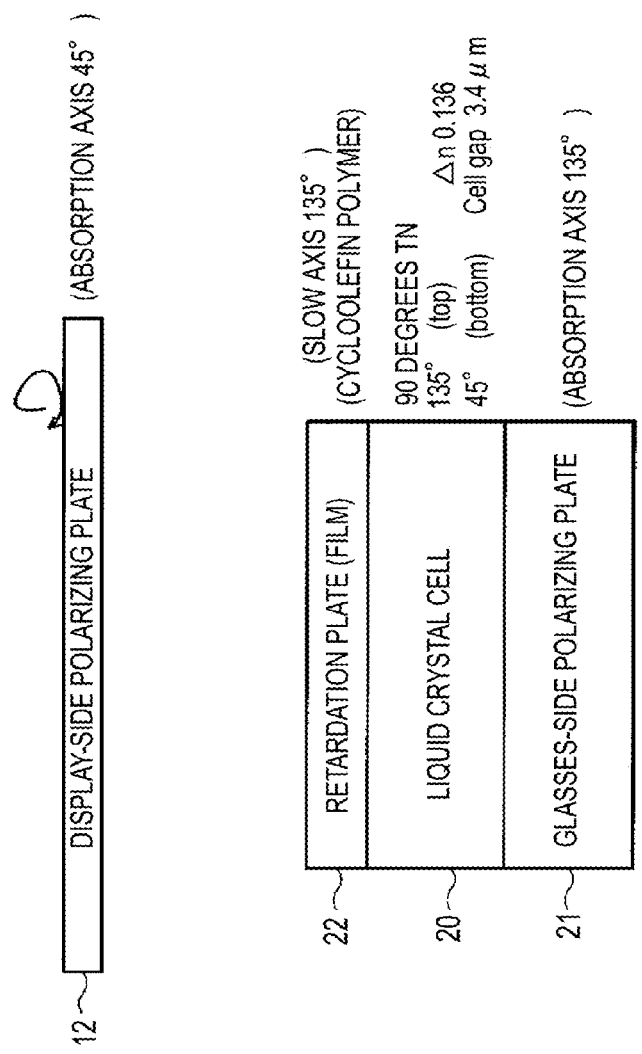

| CONTRAST VALUE | | |
|---|---|---|
| INCLINED ANGLE | WITHOUT RETARDATION | RETARDATION 70nm |
| -30 DEGREES | 2.881518969 | 2.860221722 |
| -20 DEGREES | 7.354057073 | 7.368143373 |
| -10 DEGREES | 31.9315384 | 32.51851852 |
| FRONT | 69858.33333 | 69858.33333 |
| 10 DEGREES | 31.64463764 | 31.10627401 |
| 20 DEGREES | 7.58988 | 7.57340775 |
| 30 DEGREES | 3.073890886 | 3.093203431 |

3D IMAGE DISPLAY DEVICE

FIELD

The present disclosure relates to a 3D image display device performing 3D display by using shutter glasses.

BACKGROUND

A glasses-type 3D image display device has been known in related art, which realizes 3D vision by allowing an observer to see different images having parallax with both eyes by wearing special glasses for 3D vision using liquid crystal shutters (refer to JP-A-08-327961 (Patent Document 1), JP-A-2002-82307 (Patent Document 2)). As it is necessary to allow the observer to see different parallax images with a left eye and a right eye for realizing 3D vision, two parallax images as a left-eye image and a right-eye image are necessary.

FIG. 17 shows a common glasses-type structure example of a 3D image display device in related art. The 3D display device includes a display device 101 displaying images and liquid crystal shutter-type shutter glasses 102 for observing the display device 101. The display device 101 includes a display unit 111 having a two-dimensional display panel such as a liquid crystal display device or a CRT (cathode ray tube) and a display-side polarizing plate 112 provided on the side of a display surface 111A of the display unit 111. The shutter glasses 102 include a left-eye shutter 102L arranged on the side of a left-eye 3L of the observer and a right-eye shutter 102R arranged on the side of a right-eye 3R of the observer. The left-eye shutter 102L includes, for example, a TN (Twisted Nematic) type liquid crystal cell 120, a first glasses-side polarizing plate 121 arranged at the liquid crystal cell 120 on the observer's side and a second glasses-side polarizing plate 122 arranged at the liquid crystal cell 120 on the side of the display unit 111. The right-eye shutter 102R has the same structure as the left-eye shutter 102L. In the 3D image display device, left-eye images and right-eye images are alternately displayed on the display device 101 in a time-sharing manner. The left-eye shutter 102L and the right-eye shutter 102R in the shutter glasses 102 are on/off (open/close) controlled alternately in synchronization with the display timing, thereby allowing the observer to recognize only left-eye images on the side of the left-eye 3L and to recognize only right-eye images on the side of the right-eye 3R to realize 3D vision.

SUMMARY

In the glasses-type 3D image display device, not only light of video from the display device 101 but also light of external lighting are incident according to audio/visual environment in the shutter glasses 102. There is a problem that a blinking frequency of external lighting and an opening and closing frequency of the shutter glasses 102 are interfered with each other in a specific relation and flickers occur. This is extremely uncomfortable for the observer and will cause visual fatigue.

As countermeasures against the flickers due to interference with respect to external lighting, a structure in which the second glasses-side polarizing plates 122 arranged on the side of the display unit 111 are omitted in the shutter glasses 102A is disclosed in Patent Documents 1, 2 as shown in FIG. 18. It is also conceivable to apply a polarizing plate with extremely low polarization degree instead of the second glasses-side polarizing plate 122. In the structure of FIG. 18, the shutter glasses 102A do not function as shutters with respect to light of external lighting, and function as shutters only with respect to light of video from the display device 101 emitted through the display-side polarizing plate 112, thereby preventing flickers. However, there is a problem that, in the structure of FIG. 18, when the observer inclines the head to right and left directions, namely, when the shutter glasses are inclined to right and left directions with respect to the display surface 111A, large color variation occurs in an observation image as compared with an observation state in the case where the observer faces the front and put both eyes in the horizontal direction. Moreover, the color variation occurs in a state where images are asymmetrically colored, for example, when the shutter glasses are inclined in the left direction and in the right direction respectively, which will be unnatural image display for the observer.

In order to prevent such color variation, a circularly polarizing plate (¼ wavelength plate) disclosed in, for example, Patent Document 2 can be used. That is, as shown in FIG. 19, a ¼ wavelength plate 113 is arranged on a surface of the display-side polarizing plate 112 in the display device 101 as well as a ¼ wavelength plate 123 is arranged at the liquid crystal cell 120 on the side of the display unit 111 in shutter glasses 102B. The relations between polarization axes and retardation axes in respective units are, for example, shown as FIG. 20.

As shown in FIG. 20, a polarization axis 141 of the display-side polarizing plate 112 and a polarization axis 144 of the first glasses-side polarizing plate 121 are orthogonal to each other (absorption axes of them or transmission axes of them are orthogonal to each other). A retardation axis 142 of the display-side ¼ wavelength plate 113 is inclined 45 degrees with respect to the polarization axis 141 of the display-side polarizing plate 112, and the retardation axis 142 of the display-side ¼ wavelength plate 113 and a retardation axis 143 of the glasses-side ¼ wavelength plate 123 are orthogonal to each other (slow axes of them and fast axes of the them are orthogonal to each other). Specifically, for example, when assuming that the horizontal direction is 0 (zero) degree, a direction of the polarization axis 141 of the display-side polarizing plate 112 is 90 degrees, a direction of the polarization axis 144 of the first glasses-side polarizing plate 121 is 0 (zero) degree, a direction of the retardation axis 142 of the display-side ¼ wavelength plate 113 is 135 degrees and a direction of the retardation axis 143 of the glasses-side ¼ wavelength plate 123 are 45 degrees. In such arrangement, linear polarization light emitted from the display-side polarizing plate 112 becomes circularly polarized light by the display-side ¼ wavelength plate 113 and returns to linear polarization light again by the glasses-side ¼ wavelength plate 123 to be incident on the liquid crystal cells 120, thereby allowing the shutter glasses 102B to function as shutters with respect to video light from the display device 101. However, it is necessary to arrange the ¼ wavelength plate 113 on the side of the display device 101, therefore, a wavelength plate having a large area is necessary, which leads to cost increase.

In view of the above, it is desirable to provide a 3D image display device capable of suppressing color variation occurring when shutter glasses are inclined with respect to a display surface in a simple structure.

An embodiment of the present disclosure is directed to a 3D image display device including a display unit displaying left-eye images and right-eye images alternately in a time-sharing manner, a display-side polarizing plate arranged on the side of a display surface of the display unit, and shutter glasses having a left-eye shutter and a right-eye shutter, opening and closing the left-eye shutter and the right-eye shutter in accordance with display states of images displayed on the display unit. Each of the left-eye shutter and the right-eye shutter has a liquid crystal cell, a retardation plate arranged at the liquid crystal cell on the side of the display unit, and a first glasses-side polarizing plate arranged at the liquid crystal cell on the opposite side of the side where the retardation plate is provided, and a polarization axis of the display-side polarizing plate and a polarization axis of the first glasses-side polarizing plate are orthogonal to each other as well as the polarization axis of the display-side polarizing plate and a retardation axis of the retardation plate are parallel or orthogonal to each other.

In the 3D image display device according to the embodiment of the present disclosure, the polarization axis of the display-side polarizing plate and the polarization axis of the first glasses-side polarizing plate are orthogonal to each other as well as the polarization axis of the display-side polarizing plate and the retardation axis of the retardation plate are parallel or orthogonal to each other, therefore, operations by the retardation plate are generated only when the shutter glasses are inclined with respect to the display surface and optical compensation is made so that color variation is suppressed.

According to the embodiment of the present disclosure, the display-side polarizing plate is arranged on the side of the display surface of the display unit as well as the retardation plates are arranged on the side of the shutter glasses, and the polarization axis of the display-side polarizing plate and the retardation axes of the retardation plates are arranged to be parallel or orthogonal to each other, therefore, operations by the retardation plates are generated only when the shutter glasses are inclined with respect to the display surface. Accordingly, the color variation occurring when the shutter glasses are inclined with respect to the display surface can be suppressed while maintaining normal display characteristics in a state where the shutter glasses are not inclined with respect to the display surface. Additionally, the shutter glasses are provided with the retardation plates, therefore, the retardation plates occupy a small area as compared with a case where the plates are provided in the display unit, which simplifies the structure and reduces costs.

BRIEF DESCRIPTION OF THE DRAWINGS

FIGS. 4A and 4B are structure views showing a first specific structure example of the 3D image display device shown in FIG. 1;

FIGS. 5A and 5B are structure views showing a second specific structure example of the 3D image display device shown in FIG. 1;

DETAILED DESCRIPTION

Hereinafter, embodiments of the present disclosure will be explained in detail with reference to the drawings.

First Embodiment

Entire Structure Example

Figure 1:
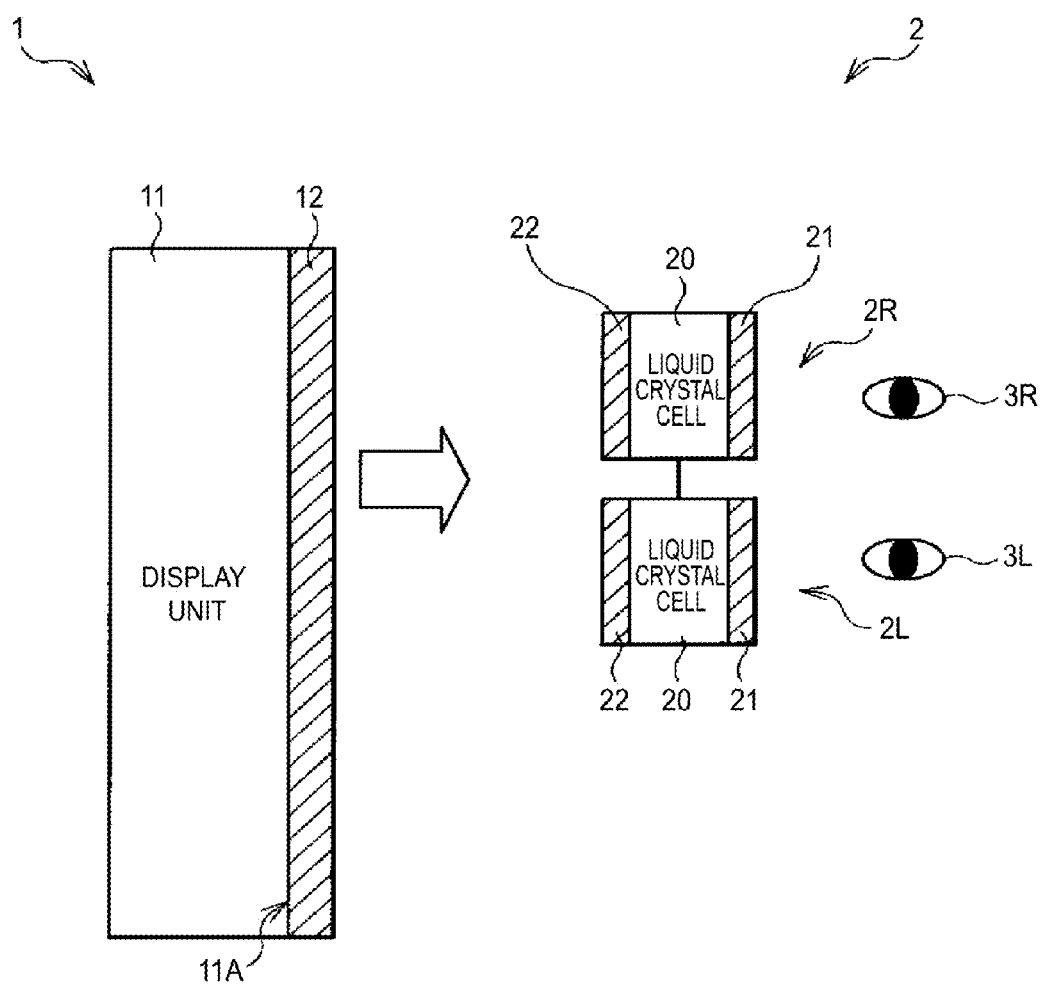
FIG. 1 is a cross-sectional view showing a structure example of a 3D image display device according to a first embodiment of the present disclosure.

FIG. 1 shows an entire structure example of a 3D image display device according to a first embodiment of the present disclosure. The 3D image display device includes a display device 1 displaying images and liquid crystal shutter-type shutter glasses 2 for observing the display device 1. The display device 1 includes a display unit 11 having a two-dimensional display panel such as a liquid crystal display device or a CRT (cathode ray tube) and a display-side polarizing plate 12 provided on the side of a display surface 11A of the display unit 11. In the case of the liquid crystal display device, a polarizing plate is normally provided on the emission side. Therefore, in the case of the liquid crystal display device, the polarizing plate provided in the liquid crystal display device itself can be used as the display-side polarizing plate 12.

The shutter glasses 2 include a left-eye shutter 2L arranged on the side of a left-eye 3L of the observer and a right-eye shutter 2R arranged on the side of a right-eye 3R of the observer. The left-eye shutter 2L includes, for example, a TN (Twisted Nematic) type or a STN (Super Twisted Nematic) type liquid crystal cell 20, a retardation plate 22 arranged at the liquid crystal cell 20 on the side of the display unit 11 and a glasses-side polarizing plate 21 arranged at the liquid crystal cell 20 on the opposite side (observer's side) of the side where the retardation plate 22 is provided. The right-eye shutter 2R has the same structure as the left-eye shutter 2L.

In the 3D image display device, left-eye images and right-eye images are alternately displayed on the display unit 11 of the display device 1 in a time-sharing manner. The left-eye shutter 2L and the right-eye shutter 2R are on/off (open/close) controlled alternately in the shutter glasses 2 in accordance with a display state of images displayed on the display unit 11, namely, in synchronization with the timing at which the left-eye images and right-eye images are alternately displayed. Accordingly, the observer is allowed to recognize only left-eye images on the side of the left-eye 3L and to recognize only right-eye images on the side of the right-eye 3R to realize 3D vision.

[Relations Between Polarization Axes and Retardation Axes of Respective Units]

The liquid crystal cells 20 of the shutter glasses 2 have a function of generating retardation in incident light and rotating the polarization state due to refractive index anisotropy included in liquid crystal molecules. In the case where the liquid crystal cells 20 are the TN type, a liquid crystal layer works so that the polarization state of linear polarization light emitted through the display-side polarizing plate 12 ideally rotates approximately 90 degrees in the polarization direction when the shutters are on (in an open state), however, phase shift of light generated by the liquid crystal layer is deviated from the optimum value when inclining the head. Moreover, the deviation differs when inclining the head to the right and to the left. In the embodiment, the retardation plate 22 is arranged as shown in, for example, FIG. 2 or FIG. 3 so as to compensate the deviation. The optimum retardation value of the retardation plate 22 appears periodically as described later, however, the retardation value is desirable to be equal to or less than 600 nm, as it is difficult to make a retardation film exceeding 600 nm, in which retardation values are not stable.

Figure 2:
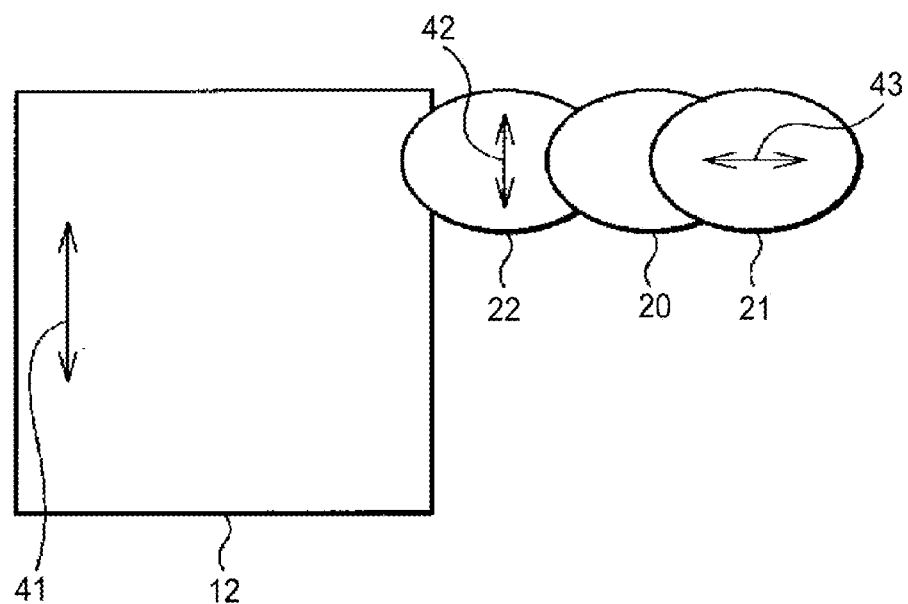
FIG. 2 is an explanatory view showing a first combination example of polarization axes and a retardation axis in respective units of the 3D image display device shown in FIG. 1.
Figure 3:
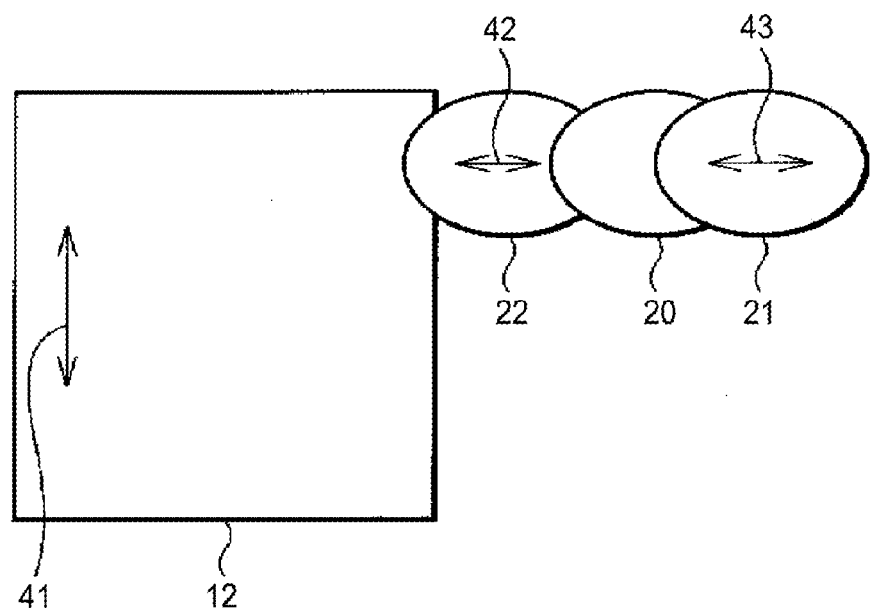
FIG. 3 is an explanatory view showing a second combination example of polarization axes and the retardation axis in respective units of the 3D image display device shown in FIG. 1.

FIG. 2 and FIG. 3 show relations between polarization axes and retardation axes in respective units of the 3D image display device shown in FIG. 1. In a first combination example shown in FIG. 2, a polarization axis 41 of the display-side polarizing plate 12 and a polarization axis 43 of the glasses-side polarizing plate 21 are orthogonal to each other (absorption axes of them or transmission axes of them are orthogonal to each other). The polarization axis 41 of the display-side polarizing plate 12 and a retardation axis 42 of the retardation plate 22 (a slow axis or a fast axis) are parallel to each other (for example, the absorption axis of the display-side polarizing plate 12 and the slow axis of the retardation plate 22 are parallel to each other). Specifically, for example, when assuming that the horizontal direction is 0 (zero) degree, a direction of the polarization axis 41 of the display-side polarizing plate 12 is 90 degrees, a direction of the polarization axis 43 of the glasses-side polarizing plate 21 is 0 (zero) degree and a direction of the retardation axis 42 of the retardation plate 22 is 90 degree. It is preferable that relative relations in the axial direction between the polarization axes and the retardation axis in respective units are the same as FIG. 2, that is, the axis angle is not limited to 0 degree and 90 degrees.

In a second combination example shown in FIG. 3, the polarization axis 41 of the display-side polarizing plate 12 and the polarization axis 43 of the glasses-side polarizing plate 21 are orthogonal to each other in the same manner as the first combination example of FIG. 2 (absorption axes of them or transmission axes of them are orthogonal to each other). On the other hand, the polarization axis 41 of the display-side polarizing plate 12 and the retardation axis 42 of the retardation plate 22 (the slow axis or the fast axis) are orthogonal to each other (for example, the absorption axis of the display-side polarizing plate 12 and the slow axis of the retardation plate 22 are orthogonal to each other). Specifically, when assuming that the horizontal direction is 0 (zero) degree, a direction of the polarization axis 41 of the display-side polarizing plate 12 is 90 degrees, a direction of the polarization axis 43 of the glasses-side polarizing plate 21 is 0 (zero) degree and a direction of the retardation axis 42 of the retardation plate 22 is 0 (zero) degree. It is preferable that relative relations in the axial direction between the polarization axes and the retardation axis in respective units are the same as FIG. 3, that is, the axis angle is not limited to 0 degree and 90 degrees.

According to the arrangement shown in FIG. 2 or FIG. 3, operations by the retardation plate 22 can be generated only when the shutter glasses 2 are inclined with respect to the display surface 11A. Therefore, it is possible to suppress color variation occurring when the shutter glasses 2 are inclined with respect to the display surface 11A while maintaining normal display characteristics in the state where the shutter glasses 2 are not inclined with respect to the display surface 11A. Additionally, the shutter glasses 2 are provided with the retardation plates 22, therefore, the retardation plates 22 occupy a small area as compared with a case where the plate is provided in the display unit 11, which simplifies the structure and reduces costs.

Specific Structure Examples and Characteristics Thereof

Hereinafter, specific examples and characteristics thereof corresponding to the arrangements shown in FIG. 2 of FIG. 3 will be explained. The explanation will be made on the assumption that the horizontal direction is 0 (zero) degree. Assume that the polarization axis 41 of the display-side polarizing plate 12 and the polarization axis 43 of the glasses-side polarizing plate 21 are absorption axes and that the retardation axis 42 of the retardation plate 22 is the slow axis.

First Specific Configuration Example

FIGS. 4A and 4B show a first specific structure example. The relative relations of respective units in the axial direction correspond to FIG. 2. In the first structure example, the direction of the polarization axis 41 of the display-side polarizing plate 12 is 135 degrees, the direction of the polarization axis 43 of the glasses-side polarizing plate 21 is 45 degrees and the direction of the retardation axis 42 of the retardation plate 22 is 135 degrees. A material of the retardation plate 22 is cycloolefin polymer. The liquid crystal cell 20 is the TN type and the difference ($\Delta n$) between a refractive index (ne) of liquid crystal molecules in a long-axis direction and a refractive index (no) in a short-axis direction is 0.136, and a cell gap is 3.4 μm. An alignment direction on a (top) side (side where the retardation plate 22 is arranged) of the liquid crystal cell 20 is 135 degrees and an alignment direction on a (bottom) side (side where the glasses-side polarizing plate 21 is arranged) is 45 degrees. That is, the direction of the retardation axis 42 of the retardation plate 22 and the alignment direction on the (top) side of the liquid crystal cell 20 are parallel.

Second Specific Structure Example

FIGS. 5A and 5B show a second specific structure example. The relative relations of respective units in the axial direction correspond to FIG. 3. In the second specific structure example, the direction of the polarization axis 41 of the display-side polarizing plate 12 is 45 degrees, the direction of the polarization axis 43 of the glasses-side polarizing plate 21 is 135 degrees and the direction of the retardation axis 42 of the retardation plate 22 is 135 degrees. A material of the retardation plate 22 is cycloolefin polymer. The liquid crystal cell 20 is the TN type and the difference ($\Delta n$) between the refractive index (ne) of liquid crystal molecules in the long-axis direction and the refractive index (no) in the short-axis direction is 0.136, and the cell gap is 3.4 μm. The alignment direction on the (top) side (side where the retardation plate 22 is arranged) of the liquid crystal cell 20 is 135 degrees and the alignment direction on the (bottom) side (side where the glasses-side polarizing plate 21 is arranged) is 45 degrees. That is, the direction of the retardation axis 42 of the retardation plate 22 and the alignment direction on the (top) side of the liquid crystal cell 20 are parallel in the same manner as the first specific example of FIGS. 4A and 4B.

Figures 6, 7:
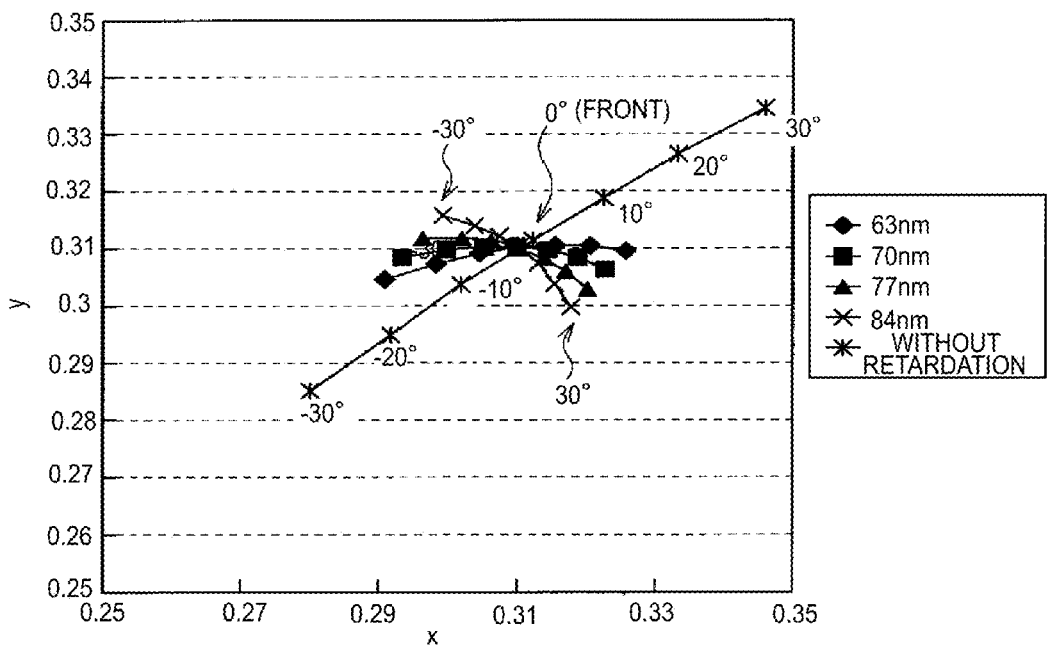
FIG. 6 is a characteristic chart showing color shift characteristics in specific structure examples shown in FIGS. 4A and 4B and FIGS. 5A and 5B.
FIG. 7 is an explanatory chart showing contrast characteristics of specific structure examples shown in FIGS. 4A and 4B and FIGS. 5A and 5B.
Figure 18:
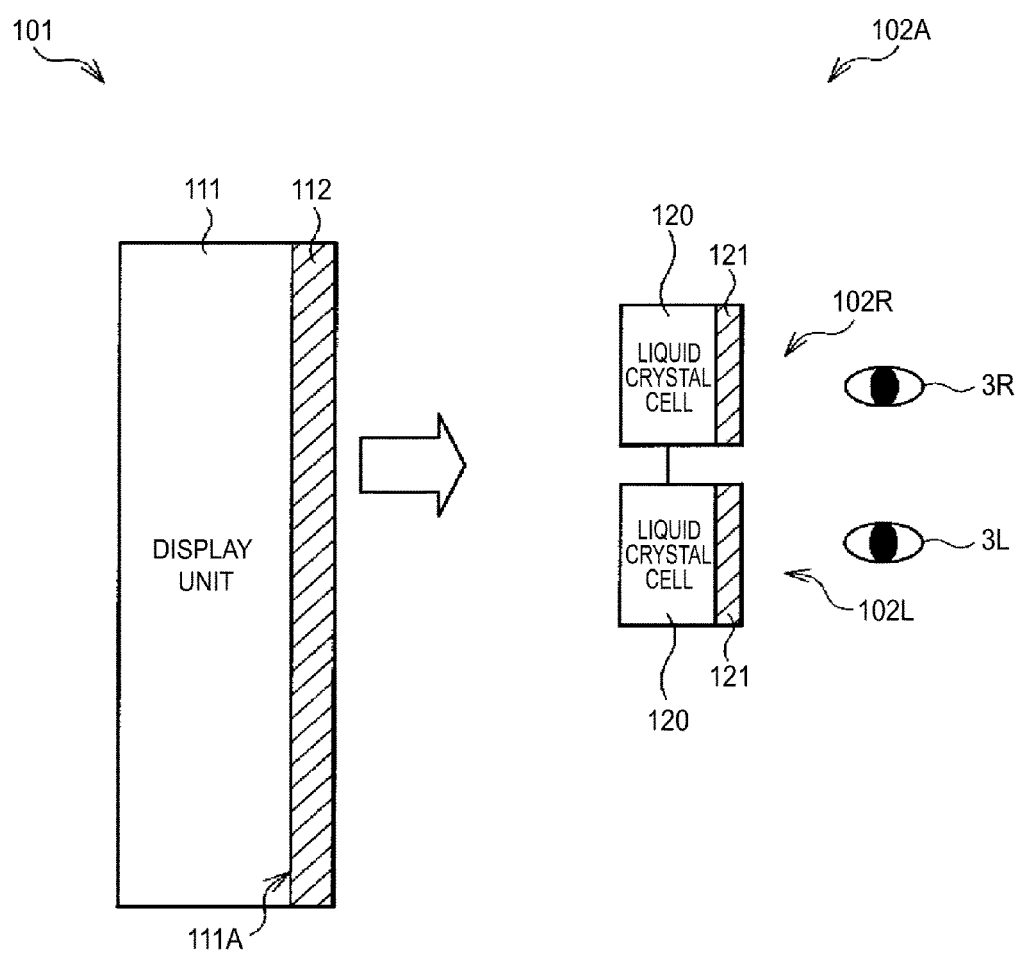
FIG. 18 is a cross-sectional view showing a second structure example of a 3D image display device in related art.
Figure 19:
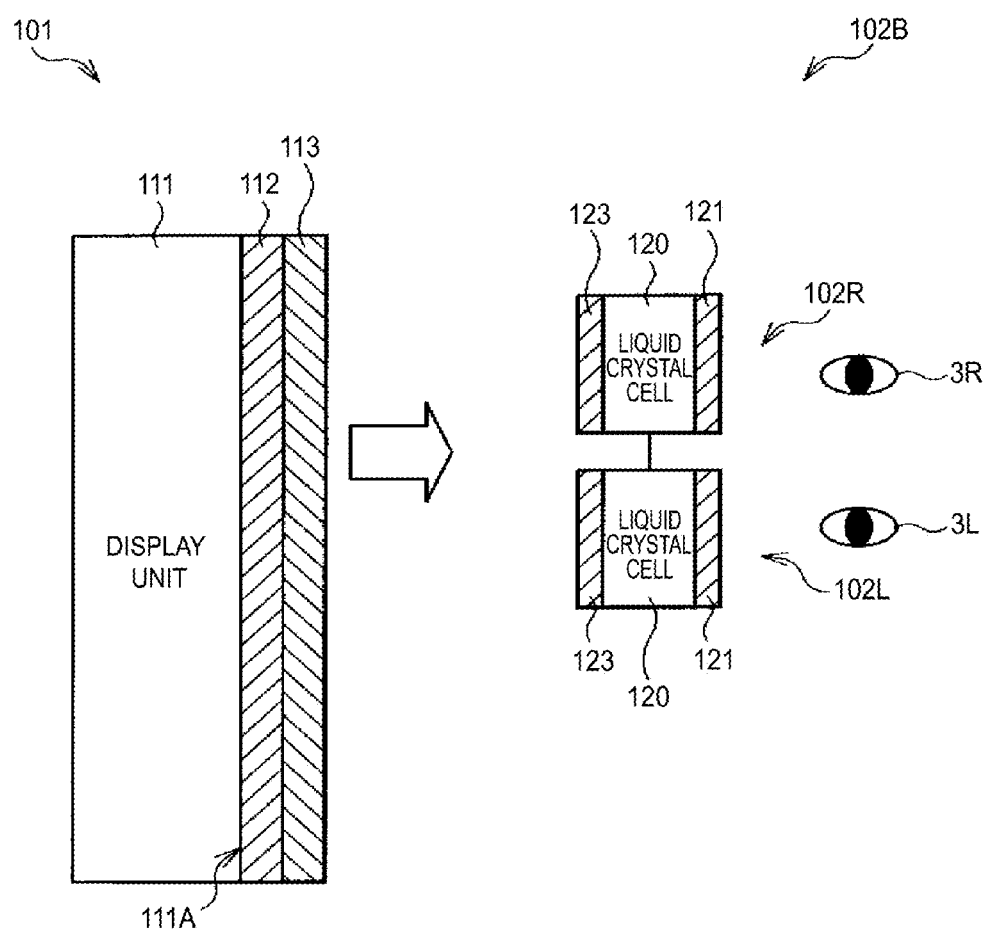
FIG. 19 is a cross-sectional view showing a third structure example of a 3D image display device in related art.
Figure 20:
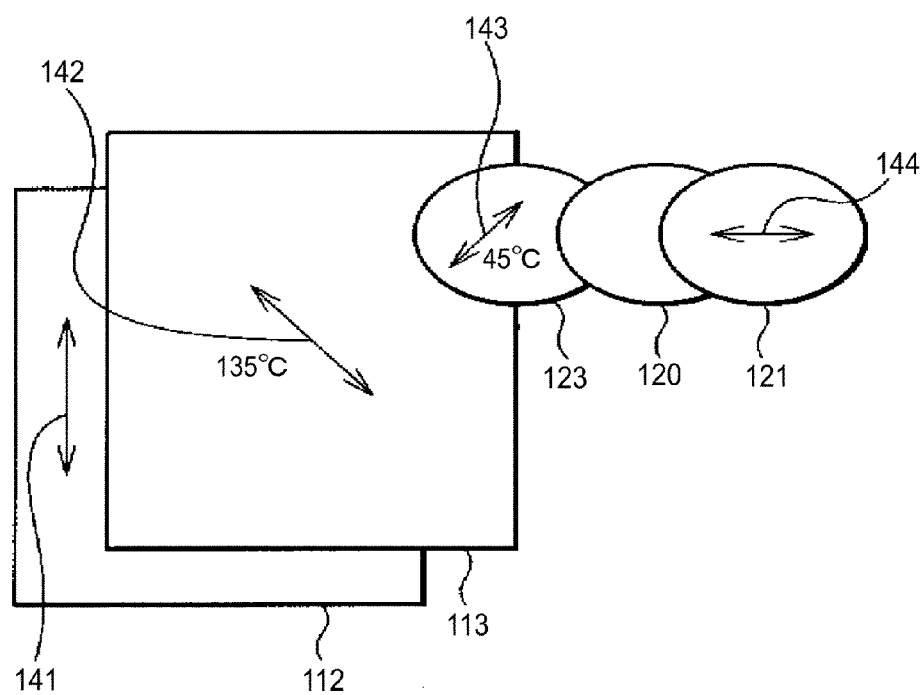
FIG. 20 is an explanatory view showing relations between polarization axes and retardation axes in respective units of the 3D image display device shown in FIG. 19.

FIG. 6 shows color shift characteristics in the first specific structure example of FIGS. 4A and 4B by an xy-chromaticity diagram. The same characteristics can be obtained in the second specific structure example of FIGS. 5A and 5B. Characteristics in a structure in which the retardation plate 22 is omitted (refer to FIG. 18) are also shown at the same time in FIG. 6 as a comparison example. FIG. 6 shows characteristics obtained by observing light from a light source including a white LED (Light Emitting Diode) while the shutters were on (open state) in the arrangement shown in FIGS. 4A and 4B. In order to check characteristics in a case corresponding to states where the shutter glasses 2 are inclined with respect to the display surface 11A of the display device 1, characteristics obtained when the display-side polarizing plate 12 was inclined in the right and left directions in a plane from −30 degrees to 30 degrees including the front (0°) were calculated. In order to check differences due to the retardation value of the retardation plate 22, characteristics obtained when the retardation value was changed to 63 nm, 70 nm, 77 nm and 84 nm were calculated. The retardation values correspond to a wavelength of 550 nm. As can be seen from the result of FIG. 6, in the structure where the retardation plate 22 is omitted, observed color widely varies depending on inclined angles. In the case where the retardation plate 22 is arranged as compared with the above case, color variation is reduced. In the result of FIG. 6, the color variation is the minimum when the retardation value of the retardation plate 22 is 70 nm.

FIG. 7 shows contrast characteristics in the first specific structure example of FIGS. 4A and 4B. The same characteristics can be obtained in the second specific structure example of FIGS. 5A and 5B. Characteristics in the structure in which the retardation plate 22 is omitted (refer to FIG. 18) are also shown at the same time in FIG. 7 as a comparison example. Characteristics obtained when the display-side polarizing plate 12 was inclined in the right and left directions in a plane from −30 degrees to 30 degrees including the front (0°) were calculated in the same manner as FIG. 6. It is found that deterioration in contrast does not occur by providing the retardation plate 22 from the result of FIG. 7.

Figure 8:
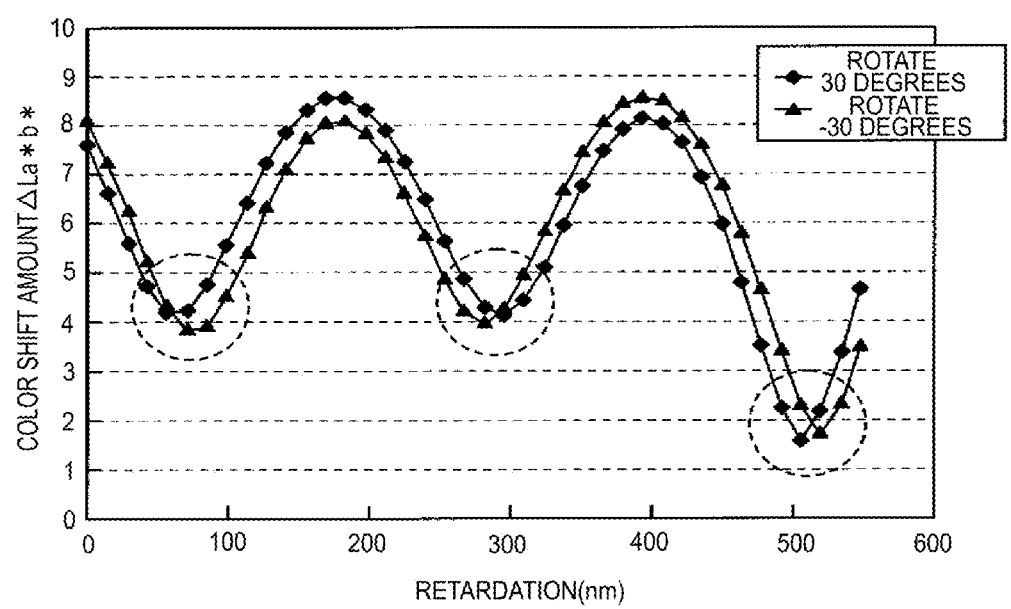
FIG. 8 is a characteristic chart showing relations between retardation values of a retardation plate and color shift amounts in specific structure examples shown in FIGS. 4A and 4B and FIGS. 5A and 5B.

FIG. 8 shows relations between retardation values of the retardation plate 22 and color shift amounts in the first specific structure example of FIGS. 4A and 4B. The same characteristics can be obtained in the second specific example of FIGS. 5A and 5B. FIG. 8 shows characteristics obtained when the display-side polarizing plate 12 was inclined −30 degrees and 30 degrees in the right and left directions in a plane. It is found from FIG. 8 that the color shift amount periodically changes according to the retardation value of the retardation plate 22. As can be seen from dotted circles in FIG. 8, the color shift amount is reduced when the retardation value is in the vicinity of 70 nm, 280 nm and so on. It is preferable that, in the retardation plate 22, a retardation value R (nm) in the wavelength of 550 nm satisfies the following values in the case of the first specific structure example of FIGS. 4A and 4B or the second specific structure example of FIGS. 5A and 5B from the result of FIG. 8.

$R=70+210*n$, in which $n=0, 1, 2$     (Expression 1)

Third Specific Structure Example

Figure 9:
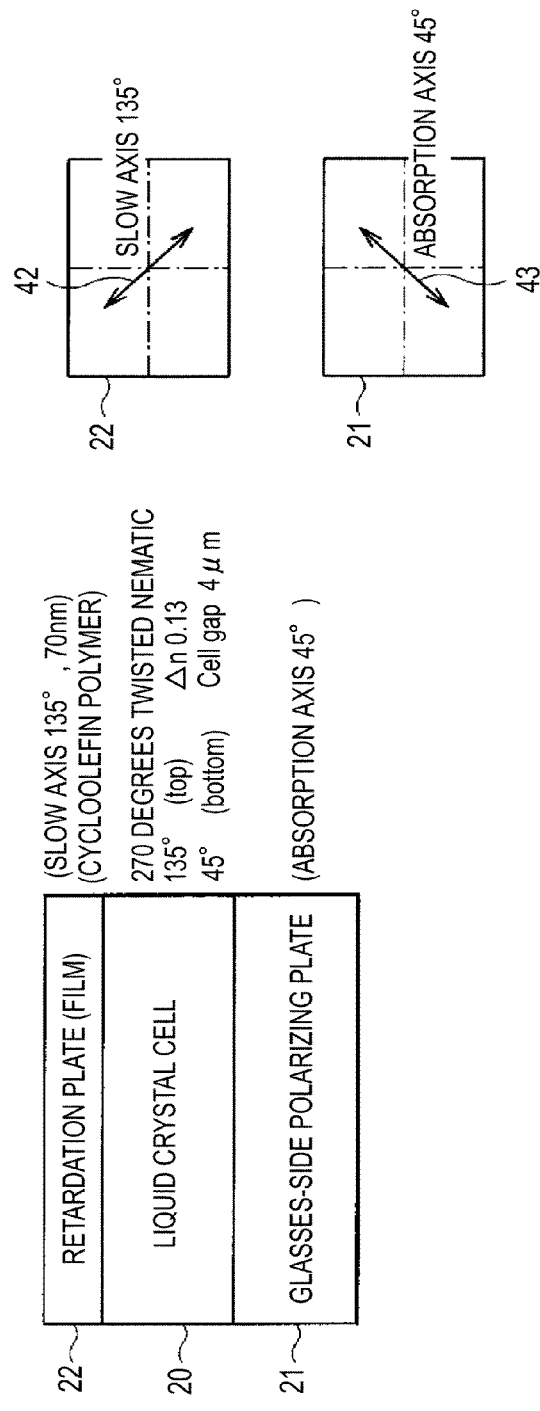
FIGS. 9A and 9B are structure views showing a third specific structure example of the 3D image display device shown in FIG. 1.

FIGS. 9A and 9B show a third specific structure example. The relative relations of respective units in the axial direction correspond to FIG. 2. In the third specific structure example, relations among the polarization axis 41 of the display-side polarizing plate 12, the direction of the polarization axis 43 of the glasses-side polarizing plate 21 and the direction of the retardation axis 42 of the retardation plate 22 are the same as the first specific example of FIGS. 4A and 4B. A material of the retardation plate 22 is cycloolefin polymer and the retardation value is 70 nm. The liquid crystal cell 20 is the STN type having a twisted angle of 270 degrees, and the difference ($\Delta n$) between the refractive index (ne) of liquid crystal molecules in the long-axis direction and the refractive index (no) in the short-axis direction is 0.13, and the cell gap is 4 μm. The alignment direction on the (top) side (side where the retardation plate 22 is arranged) of the liquid crystal cell 20 is 135 degrees and the alignment direction on the (bottom) side (side where the glasses-side polarizing plate 21 is arranged) is 45 degrees. That is, the direction of the retardation axis 42 of the retardation plate 22 and the alignment direction on the (top) side of the liquid crystal cell 20 are parallel in the same manner as first structure example of FIGS. 4A and 4B.

Figure 10:
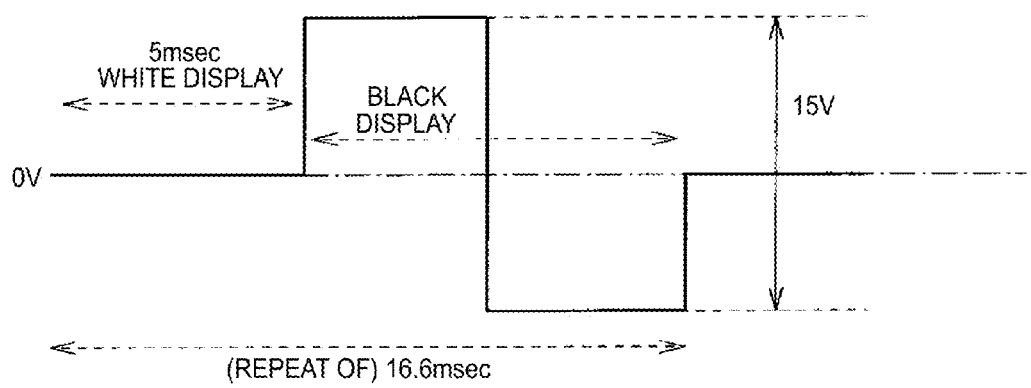
FIG. 10 is a waveform diagram showing an example of a drive waveform of shutter glasses in the specific structure example shown in FIGS. 9A and 9B.

FIG. 10 shows a drive waveform of the shutter glasses 2 (liquid crystal cells 20) in the third structure example of FIGS. 9A and 9B. In driving conditions shown in FIG. 10, the same characteristics as the first specific structure example of FIGS. 4A and 4B can be obtained.

Fourth Specific Structure Example

Figure 11:
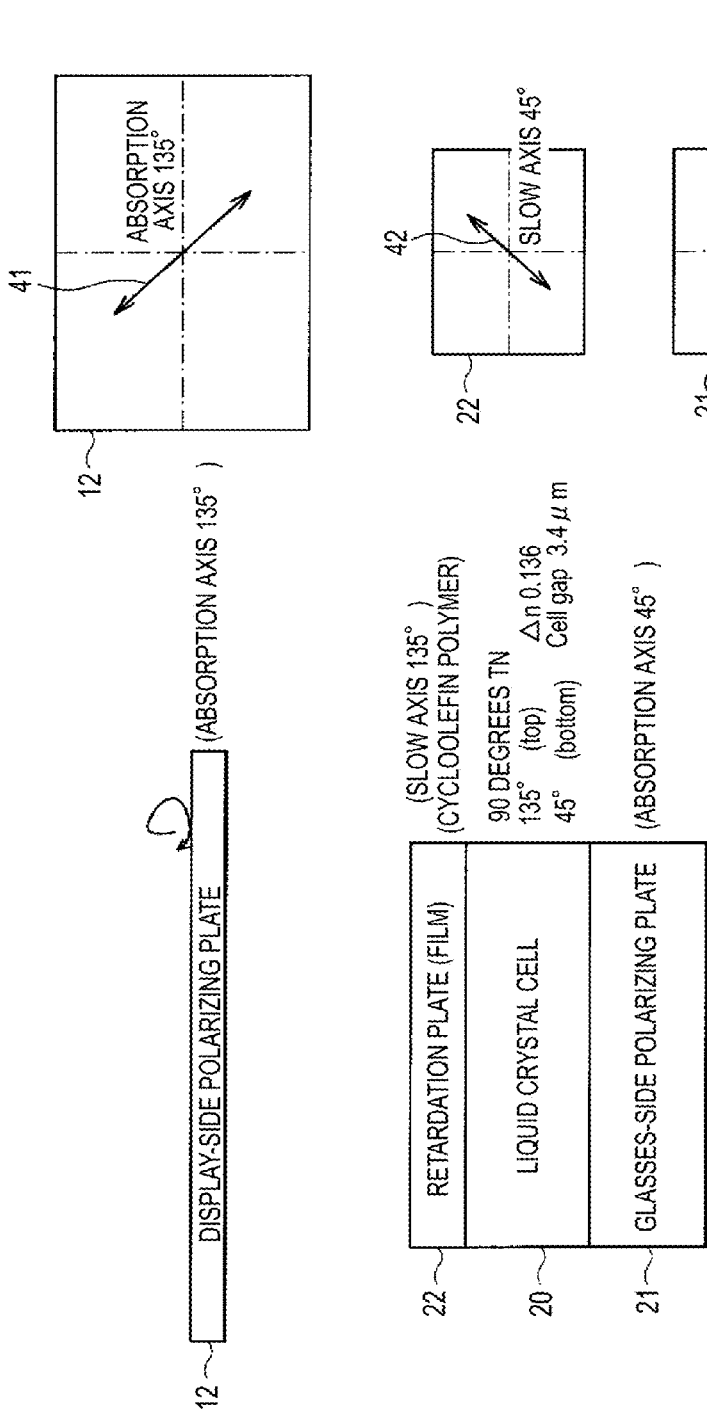
FIGS. 11A and 11B are structure views showing a fourth specific structure example of the 3D image display device shown in FIG. 1.

FIGS. 11A and 11B show a fourth specific structure example. The relative relations of respective units in the axial direction correspond to FIG. 3. In the fourth specific structure example, the direction of the polarization axis 41 of the display-side polarizing plate 12 is 135 degrees, the direction of the polarization axis 43 of the glasses-side polarizing plate 21 is 45 degrees and the direction of the retardation axis 42 of the retardation plate 22 is 45 degrees. A material of the retardation plate 22 is cycloolefin polymer. The liquid crystal cell 20 is the TN type and the difference ($\Delta n$) between the refractive index (ne) of liquid crystal molecules in the long-axis direction and the refractive index (no) in the short-axis direction is 0.136, and the cell gap is 3.4 μm. The alignment direction on the (top) side (side where the retardation plate 22 is arranged) of the liquid crystal cell 20 is 135 degrees and the alignment direction on the (bottom) side (side where the glasses-side polarizing plate 21 is arranged) is 45 degrees. That is, the direction of the retardation axis 42 of the retardation plate 22 and the alignment direction on the (top) side of the liquid crystal cell 20 are orthogonal to each other, which is different from the first specific structure example of FIGS. 4A and 4B.

Fifth Specific Example

Figure 12:
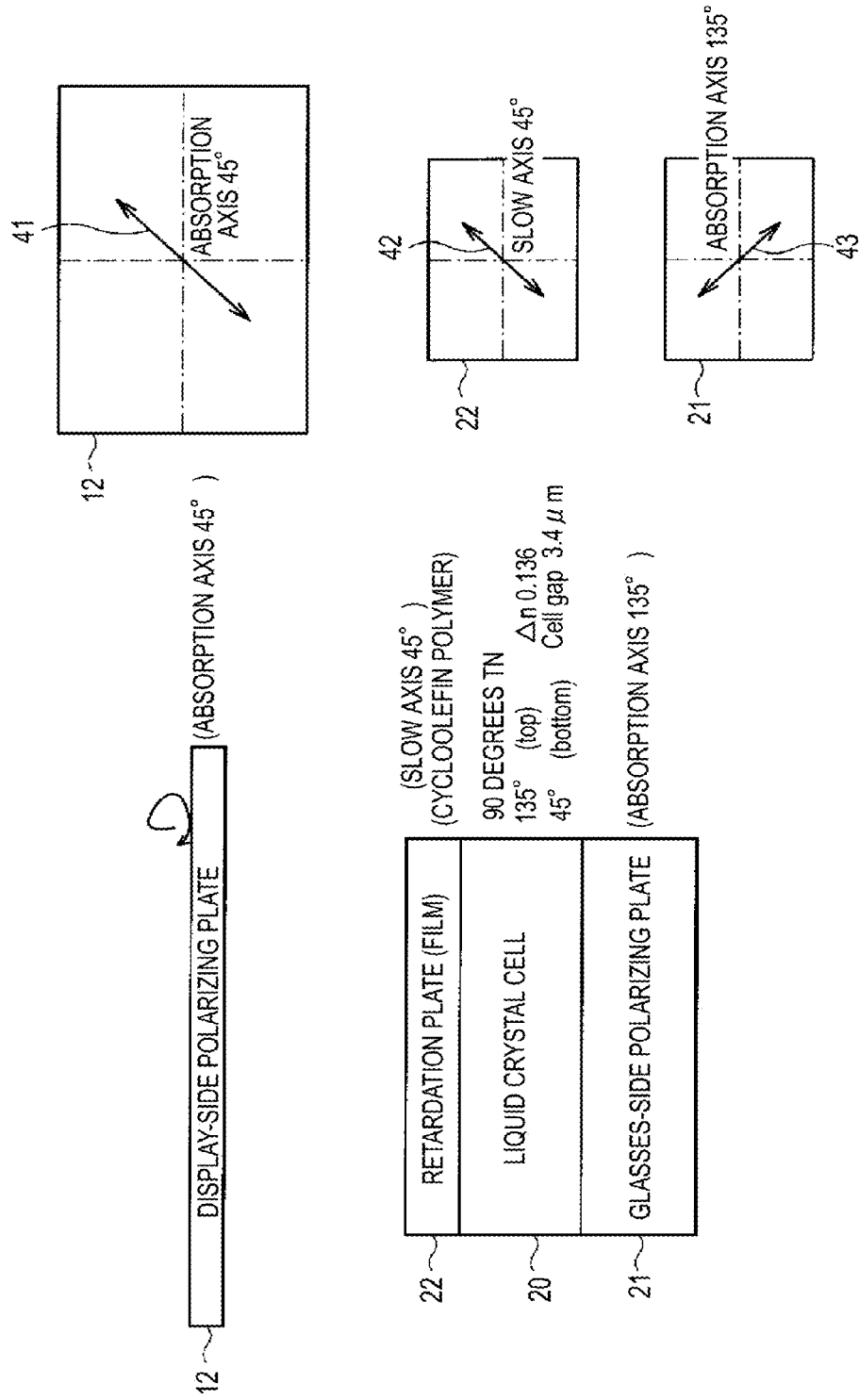
FIGS. 12A and 12B are structure views showing a fifth specific structure example of the 3D image display device shown in FIG. 1.

FIGS. 12A and 12B show a fifth specific structure example. The relative relations of respective units in the axial direction correspond to FIG. 2. In the fifth specific structure example, the direction of the polarization axis 41 of the display-side polarizing plate 12 is 45 degrees, the direction of the polarization axis 43 of the glasses-side polarizing plate 21 is 135 degrees and the direction of the retardation axis 42 of the retardation plate 22 is 45 degrees. A material of the retardation plate 22 is cycloolefin polymer. The liquid crystal cell 20 is the TN type and the difference (Δn) between the refractive index (ne) of liquid crystal molecules in the long-axis direction and the refractive index (no) in the short-axis direction is 0.136, and the cell gap is 3.4 μm. The alignment direction on the (top) side (side where the retardation plate 22 is arranged) of the liquid crystal cell 20 is 135 degrees and the alignment direction on the (bottom) side (side where the glasses-side polarizing plate 21 is arranged) of the liquid crystal cell 20 is 45 degrees. That is, the direction of the retardation axis 42 of the retardation plate 22 and the alignment direction on the (top) side of the liquid crystal cell 20 are orthogonal to each other, which is different from the first specific structure example of FIGS. 4A and 4B.

Figure 13:
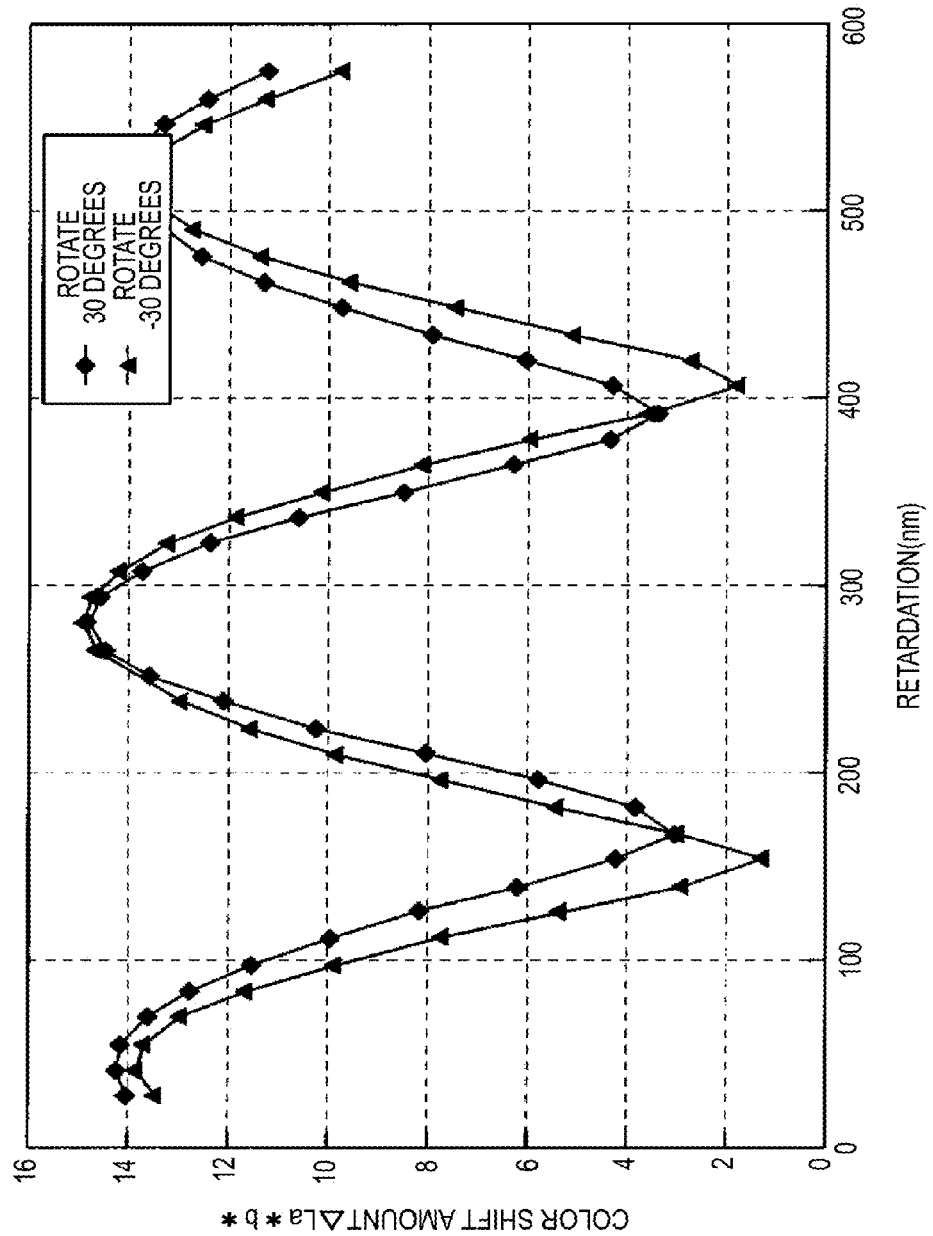
FIG. 13 is a characteristic chart showing relations between retardation values of a retardation plate and color shift amounts in the specific structure example shown in FIGS. 11A and 11B and FIGS. 12A and 12B.

FIG. 13 shows relations between retardation values of the retardation plate 22 and color shift amounts in the fourth specific structure example of FIGS. 11A and 11B. The same characteristics can be obtained in the fifth specific example of FIGS. 12A and 12B. FIG. 13 shows characteristics obtained when the display-side polarizing plate 12 was inclined −30 degrees and 30 degrees in the right and left directions in a plane in the same manner as in the case of FIG. 8. It is found from FIG. 13 that the color shift amount periodically changes according to the retardation value of the retardation plate 22. It is also found in FIG. 13 that the color shift amount is reduced when the retardation value is in the vicinity of 150 nm, 400 nm and so on. It is preferable that, in the retardation plate 22, a retardation value R (nm) in the wavelength of 550 nm satisfies the following values in the case of the fourth specific structure example of FIGS. 11A and 11B or the fifth specific structure example of FIGS. 12A and 12B from the result of FIG. 13.

$R=150+250*n$, in which $n=0, 1, 2$  (Expression 2)

It is found that the optimum retardation value of the retardation plate 22 is determined according to the relation between the direction of the retardation axis 42 of the retardation plate 22 and the alignment direction on the (top) side of the liquid crystal cell 20 from the results of FIG. 8 and FIG. 13. That is, when the direction of the retardation axis 42 and the alignment direction on the (top) side of the liquid crystal cell 20 are parallel to each other as the first specific structure example of FIGS. 4A and 4B or the second specific structure example of FIGS. 5A and 5B, it is preferable to use the above retardation values of the expression (1). When the when the direction of the retardation axis 42 and the alignment direction on the (top) side of the liquid crystal cell 20 are orthogonal to each other, as the fourth specific structure example of FIGS. 11A and 11B or the fifth specific structure example of FIGS. 12A and 12B, it is preferable to use the above retardation values of the expression (2).

Second Embodiment

Next, a 3D image display device according to a second embodiment of the present disclosure will be explained. Same numerals and signs are given to the components which are substantially the same as the 3D image display device according to the first embodiment and explanation will be suitably omitted.

Figure 14:
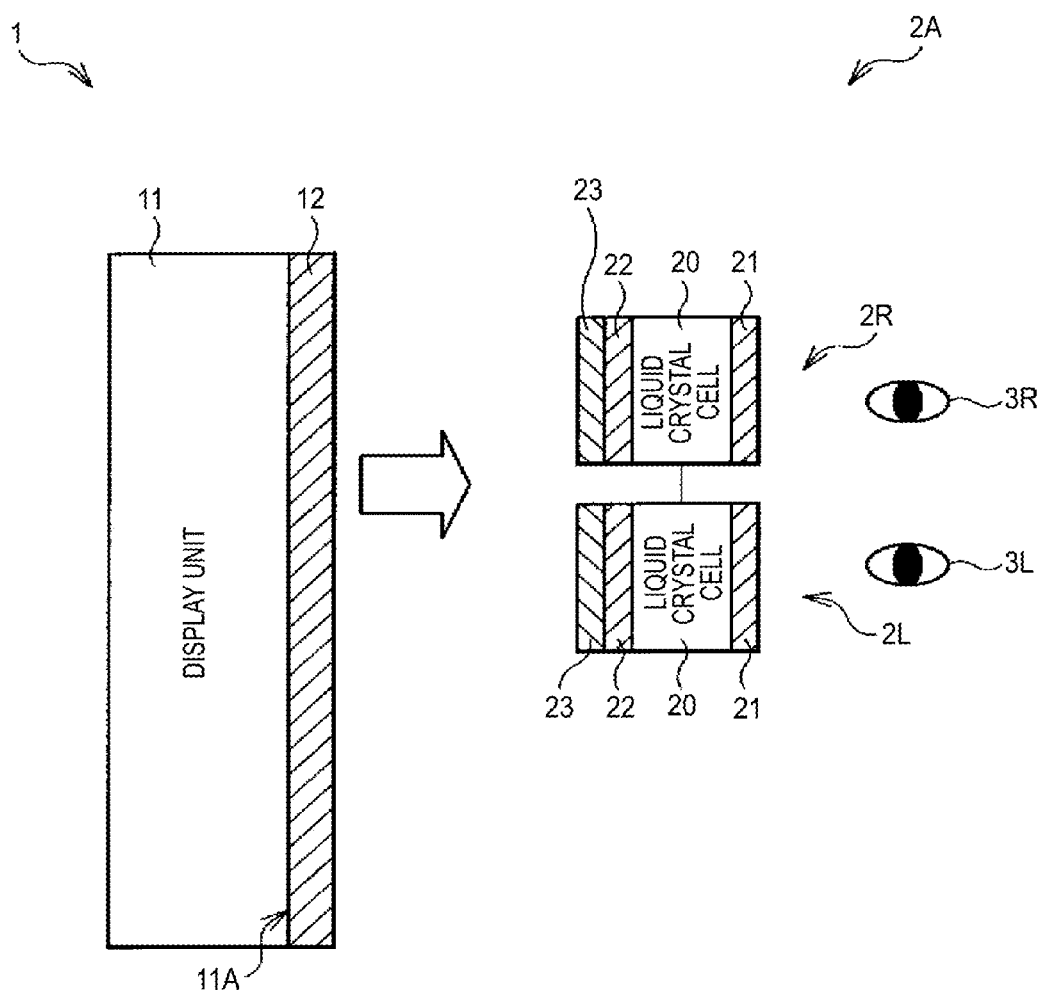
FIG. 14 is a cross-sectional view showing a structure example of a 3D image display device according to a second embodiment of the present disclosure.

FIG. 14 shows an entire structure example of a 3D image display device according to the embodiment of the present disclosure. The 3D image display device further includes low-polarization degree polarizing plates 23 in the 3D image display device (FIG. 1) according to the first embodiment. The low-polarization degree polarizing plates 23 are arranged on the front side of the retardation plates 22 (between the display-side polarizing plate 12 and the retardation plate 22) in respective left-eye shutter 2L and the right-eye shutter 2R of shutter glasses 2A. In the embodiment, the glasses-side polarizing plate 21 corresponds to a "first glasses-side polarizing plate" and the low-polarization degree polarizing plates 23 corresponds to a "second glasses-side polarizing plate".

Figure 15A:
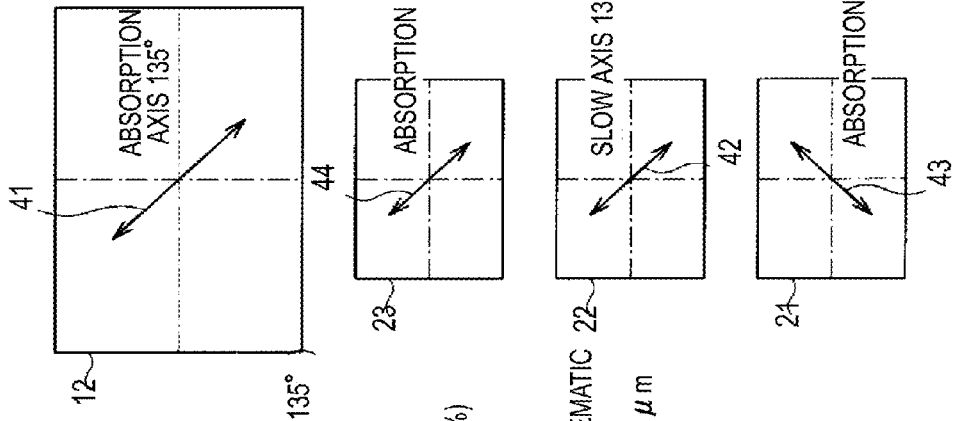
FIGS. 15A and 15B are structure views showing a specific structure example of the 3D image display device shown in FIG. 14.
Figure 15B:
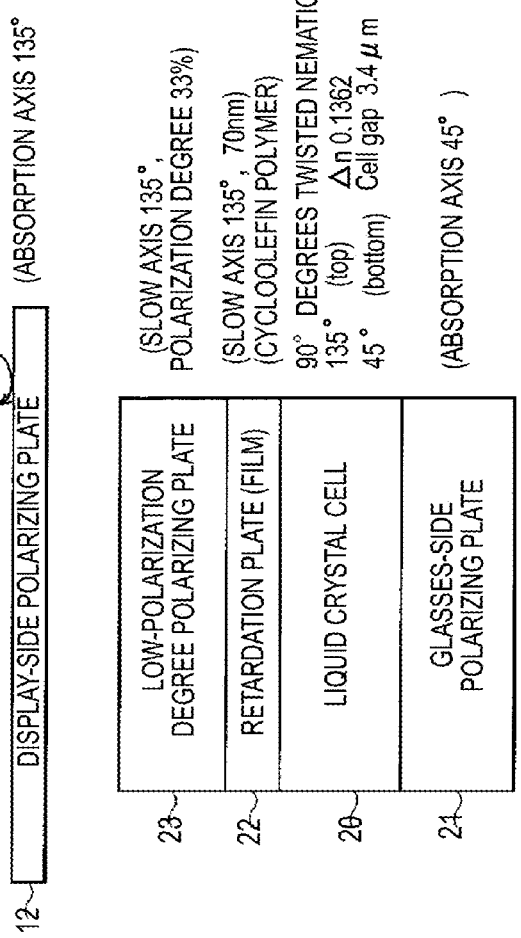

The low-polarization degree polarizing plates 23 is arranged so that the polarization axis 41 of the display-side polarizing plate 12 and a polarization axis 44 of the low-polarization degree polarizing plates 23 are parallel to each other as shown in FIG. 15B as an example. The polarization degree of the low-polarization degree polarizing plates 23 is equal to or less than 50%. The polarization degree is defined as follows.

(Polarization degree)=$(P1-P2)/(P1+P2)$

P1 is transmittance obtained when respective polarization axes of two polarizing plates are arranged in parallel, and P2 is transmittance obtained when respective polarization axes of two polarizing plates are arranged to be orthogonal to each other.

FIGS. 15A and 15B show a specific structure example of the 3D image display device according to the embodiment. The relative relations of respective units in the axial direction other than the low-polarization degree polarizing plates 23 correspond to FIG. 2. In the specific structure example, relations among the polarization axis 41 of the display-side polarizing plate 12, the polarization axis 43 of the glasses-side polarizing plate 21 and the retardation axis 42 of the retardation plate 22 are the same as in the first specific structure example of FIGS. 4A and 4B in the first embodiment. The structure of the liquid crystal cell 20 is also the same as the first specific structure example of FIGS. 4A and 4B. The polarization axis 44 (absorption axis) of the low-polarization degree polarizing plates 23 is 135 degrees, which is the same as the direction of the polarization axis 41 of the display-side polarizing plate 12. The polarization degree of the low-polarization degree polarizing plates 23 is 33%. A material of the retardation plate 22 is cycloolefin polymer and a retardation value with respect to the wavelength of 550 nm is 70 nm.

Figure 16:
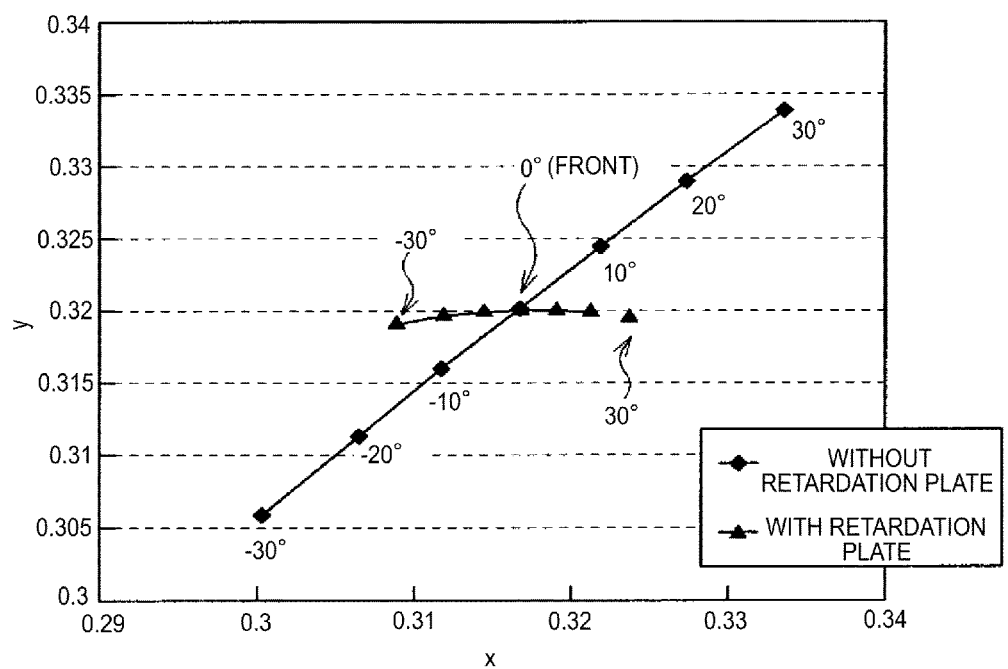
FIG. 16 is a characteristic chart showing color shift characteristics in the specific structure example shown in FIGS. 15A and 15B.
Figure 17:
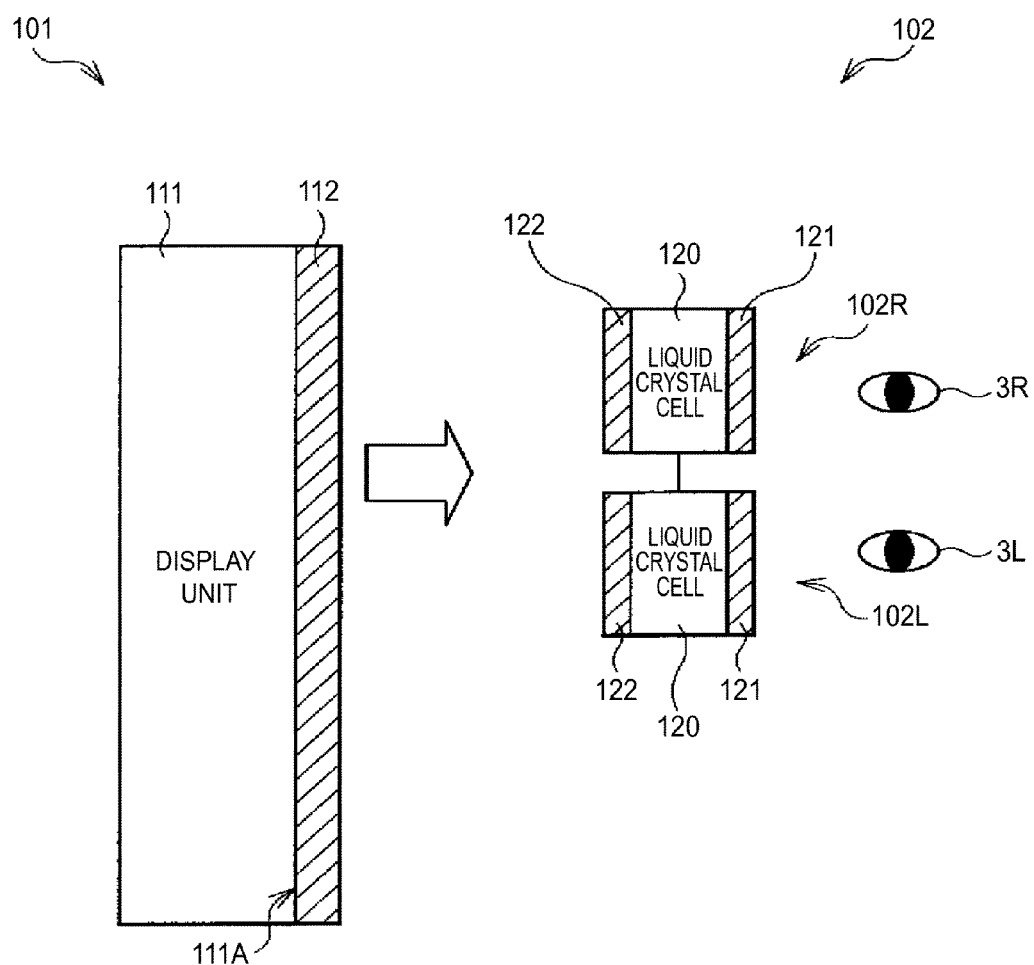
FIG. 17 is a cross-sectional view showing a first structure example of a 3D image display device in related art.

FIG. 16 is shows color shift characteristics in the specific structure example of FIGS. 15A and 15B by an xy-chromaticity diagram. Characteristics in a structure in which the retardation plate 22 is omitted (refer to FIG. 18) are also shown at the same time in FIG. 16 as a comparison example. FIG. 16 shows characteristics obtained by observing light from a light source including a white LED (Light Emitting Diode) while the shutters were on (open state) in the arrangement shown in FIGS. 15A and 15B. In order to check characteristics in a case corresponding to states where the shutter glasses 2A are inclined with respect to the display surface 11A of the display device 1, characteristics obtained when the display-side polarizing plate 12 was inclined in the right and left directions in a plane from −30 degrees to 30 degrees including the front (0°) were calculated in the same manner as in the case of FIG. 6. The retardation value of the retardation plate 22 is 70 nm as described above. As can be seen from the result of FIG. 16, in the structure where the retardation plate 22 is omitted, observed color widely varies. In the case where the retardation plate 22 is arranged as compared with the above case, color variation is reduced.

It is also possible to apply a structure in which the low-polarization degree polarizing plates 23 is arranged on the front side of the retardation plate 22 in the arrangement where the polarization axis 41 of the display-side polarizing plate 12 and the retardation axis 42 of the retardation plate 22 are orthogonal to each other (refer to FIG. 3, FIGS. 5A and 5B and so on).

The present disclosure contains subject matter related to that disclosed in Japanese Priority Patent Application JP 2010-223813 filed in the Japan Patent Office on Oct. 1, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A 3D image display device comprising:
  a display unit displaying left-eye images and right-eye images alternately in a time-sharing manner;
  a display-side polarizing plate arranged on a side of a display surface of the display unit; and
  shutter glasses having a left-eye shutter and a right-eye shutter, opening and closing the left-eye shutter and the right-eye shutter in accordance with display states of images displayed on the display unit,
  wherein each of the left-eye shutter and the right-eye shutter includes
    a liquid crystal cell,
    a retardation plate arranged at the liquid crystal cell on the side of the display unit, and
    a first glasses-side polarizing plate arranged at the liquid crystal cell on an opposite side of the side where a retardation plate is provided, and
  a polarization axis of the display-side polarizing plate and a polarization axis of the first glasses-side polarizing plate are orthogonal to each other, and the polarization axis of the display-side polarizing plate and a retardation axis of the retardation plate are parallel or orthogonal to each other.

2. The 3D image display device according to claim 1,
  wherein each of the left-eye shutter and the right-eye shutter includes a second glasses-side polarizing plate arranged between the display-side polarizing plate and the retardation plate, and
  wherein a polarization degree of the second glasses-side polarization plate is less than or equal to 50%, and the polarization axis of the display-side polarizing plate and the polarization axis of the second glasses-side polarization plate are parallel to each other.

3. The 3D image display device according to claim 1,
  wherein the retardation plate is formed so that a retardation value R (nm) in a wave length of 550 nm satisfies:

$R = 70 + 210*n$, in which $n = 0, 1, 2 \ldots$

4. The 3D image display device according to claim 3,
  wherein the liquid crystal cell is a twisted nematic type liquid crystal cell, and
  wherein an alignment direction on a side of the retardation plate is parallel to a retardation axis of the retardation plate.

5. The 3D image display device according to claim 1,
  wherein the retardation plate is formed so that a retardation value R (nm) in a wave length of 550 nm satisfies:

$R = 150 + 250*n$, in which $n = 0, 1, 2 \ldots$

6. The 3D image display device according to claim 5,
  wherein the liquid crystal cell is the twisted nematic type liquid crystal cell, and
  wherein an alignment direction on the side of a retardation plate is orthogonal to the retardation axis of the retardation plate.

7. The 3D image display device according to claim 1,
  wherein the shutter glasses further include second glasses-side polarizing plates arranged between the display-side polarizing plate and the retardation plates, and
  a polarization degree of the second glasses-side polarization plates is less than or equal to 50%, and the polarization axis of the display-side polarizing plate and the polarization axes of the second glasses-side polarization plates are parallel to each other.

8. A 3D image display device comprising:
  a display unit;
  a display-side polarizing plate arranged on a side of a display surface of the display unit; and
  shutter glasses,
  wherein the shutter glasses include
    liquid crystal cells,
    retardation plates arranged at the liquid crystal cells on the side of the display unit, and
    first glasses-side polarizing plates arranged at the liquid crystal cells on an opposite side of the side where the retardation plates are provided, and
  wherein a polarization axis of the display-side polarizing plate and polarization axes of the first glasses-side polarizing plates are orthogonal to each other, and the polarization axis of the display-side polarizing plate and retardation axes of the retardation plates are parallel or orthogonal to each other.

* * * * *